Nov. 23, 1937.   C. E. JENKINS   2,099,739
EXTRACTION OF JUICE FROM VEGETABLE PULP AND LIKE MATERIALS
Filed Jan. 17, 1934   4 Sheets-Sheet 2
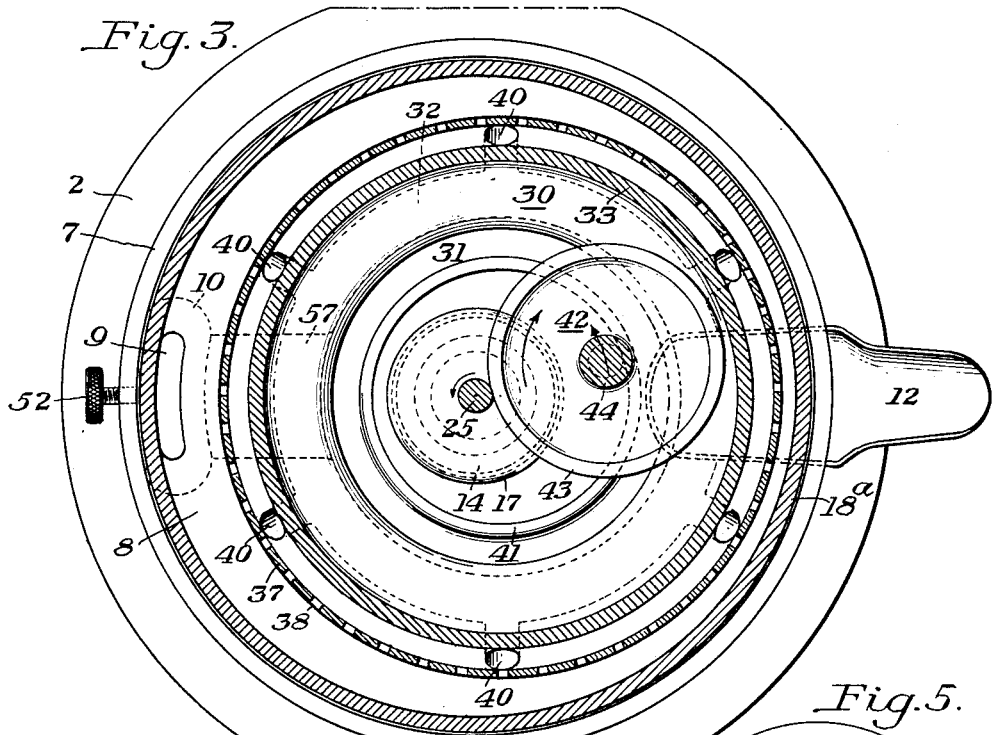
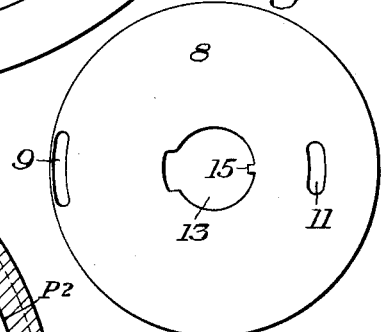
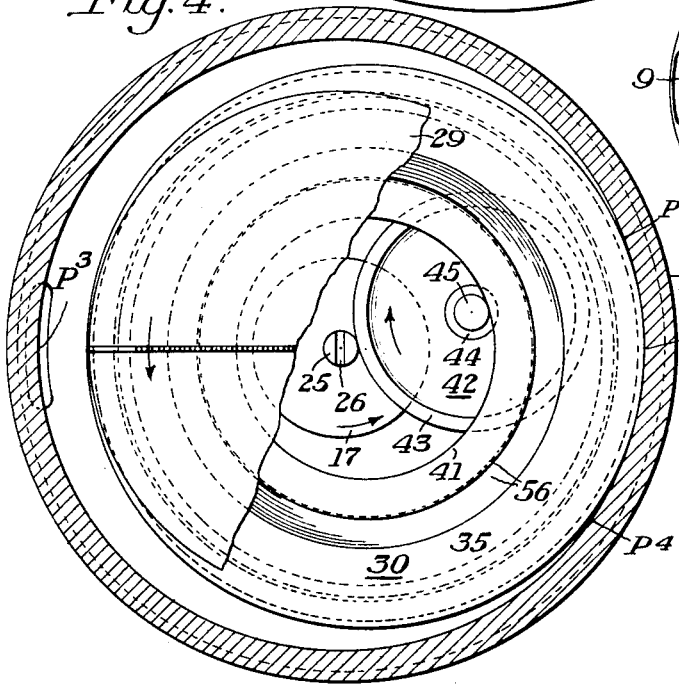
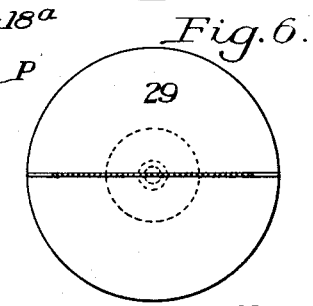
INVENTOR
Clarence E. Jenkins
by his attorneys Nov. 23, 1937. C. E. JENKINS 2,099,739
EXTRACTION OF JUICE FROM VEGETABLE PULP AND LIKE MATERIALS
Filed Jan. 17, 1934 4 Sheets-Sheet 3
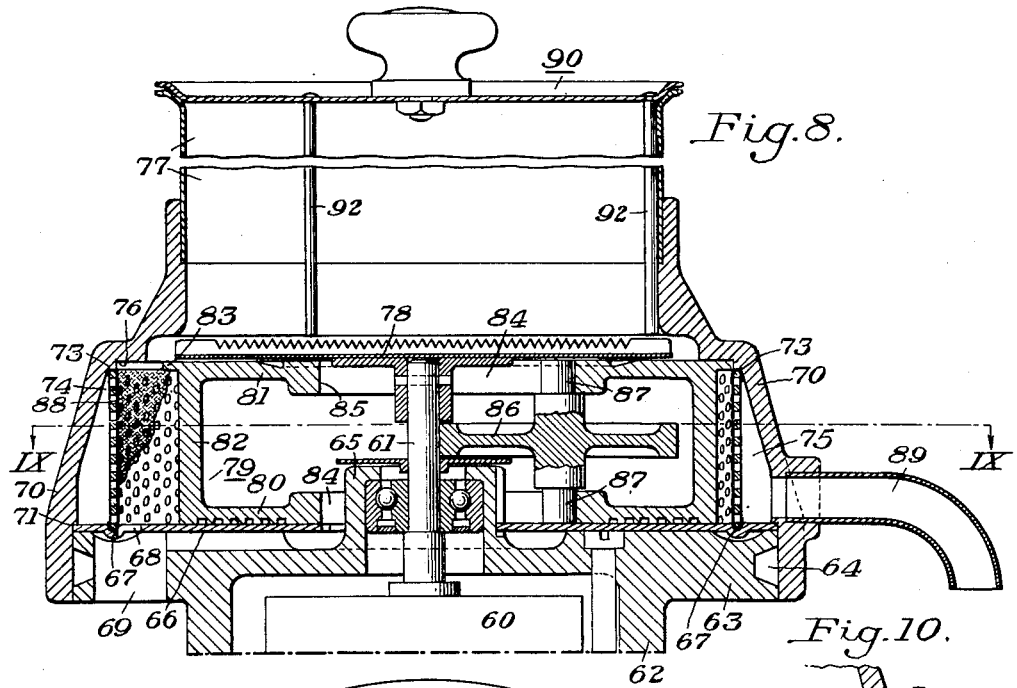
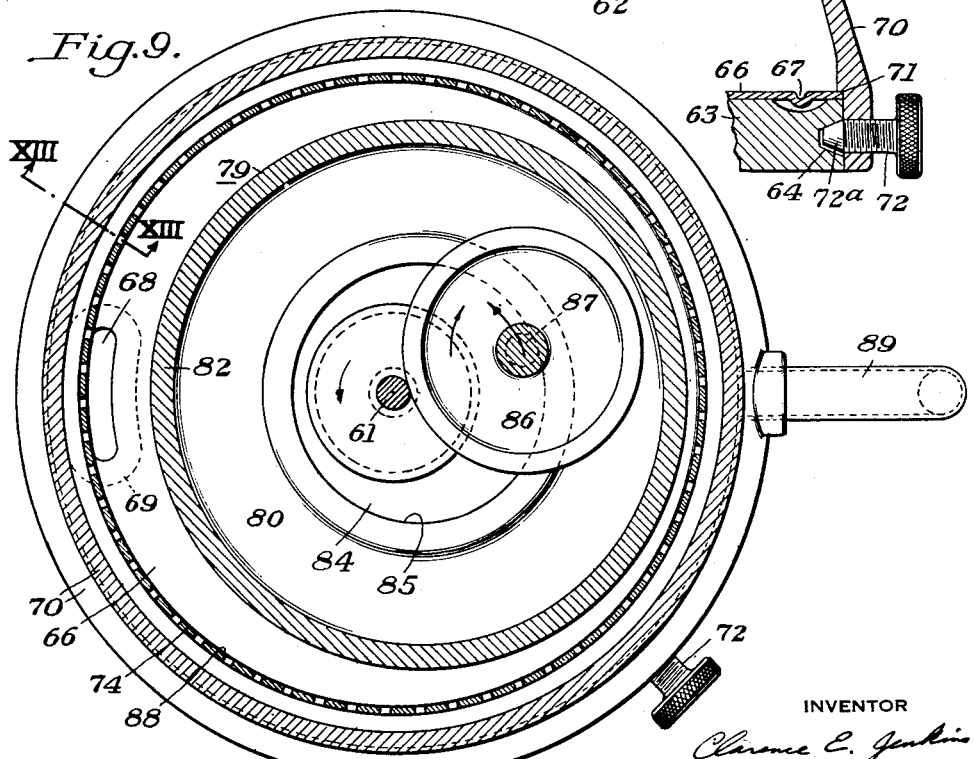
INVENTOR Nov. 23, 1937. C. E. JENKINS 2,099,739
EXTRACTION OF JUICE FROM VEGETABLE PULP AND LIKE MATERIALS
Filed Jan. 17, 1934   4 Sheets-Sheet 4
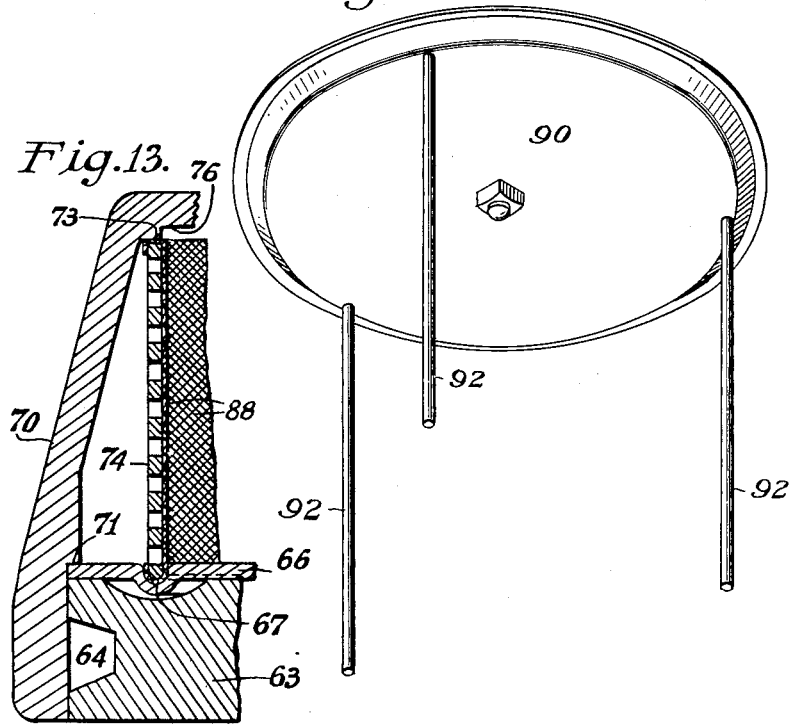
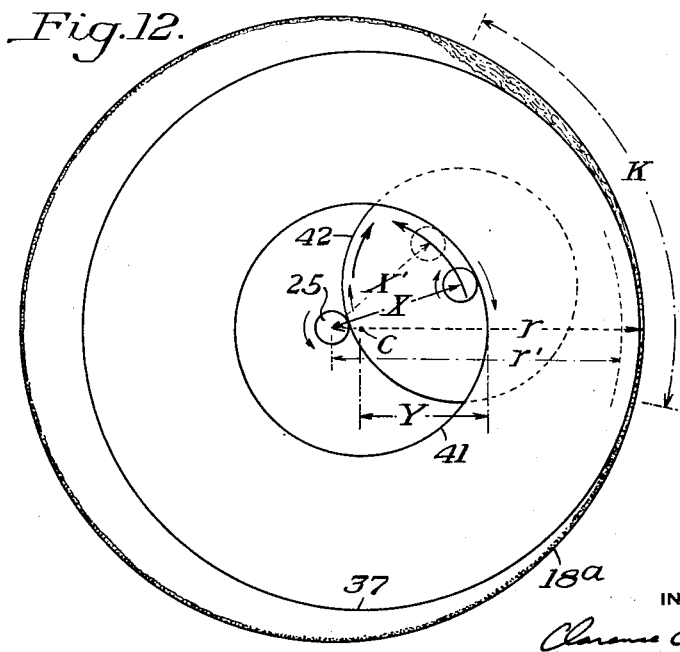

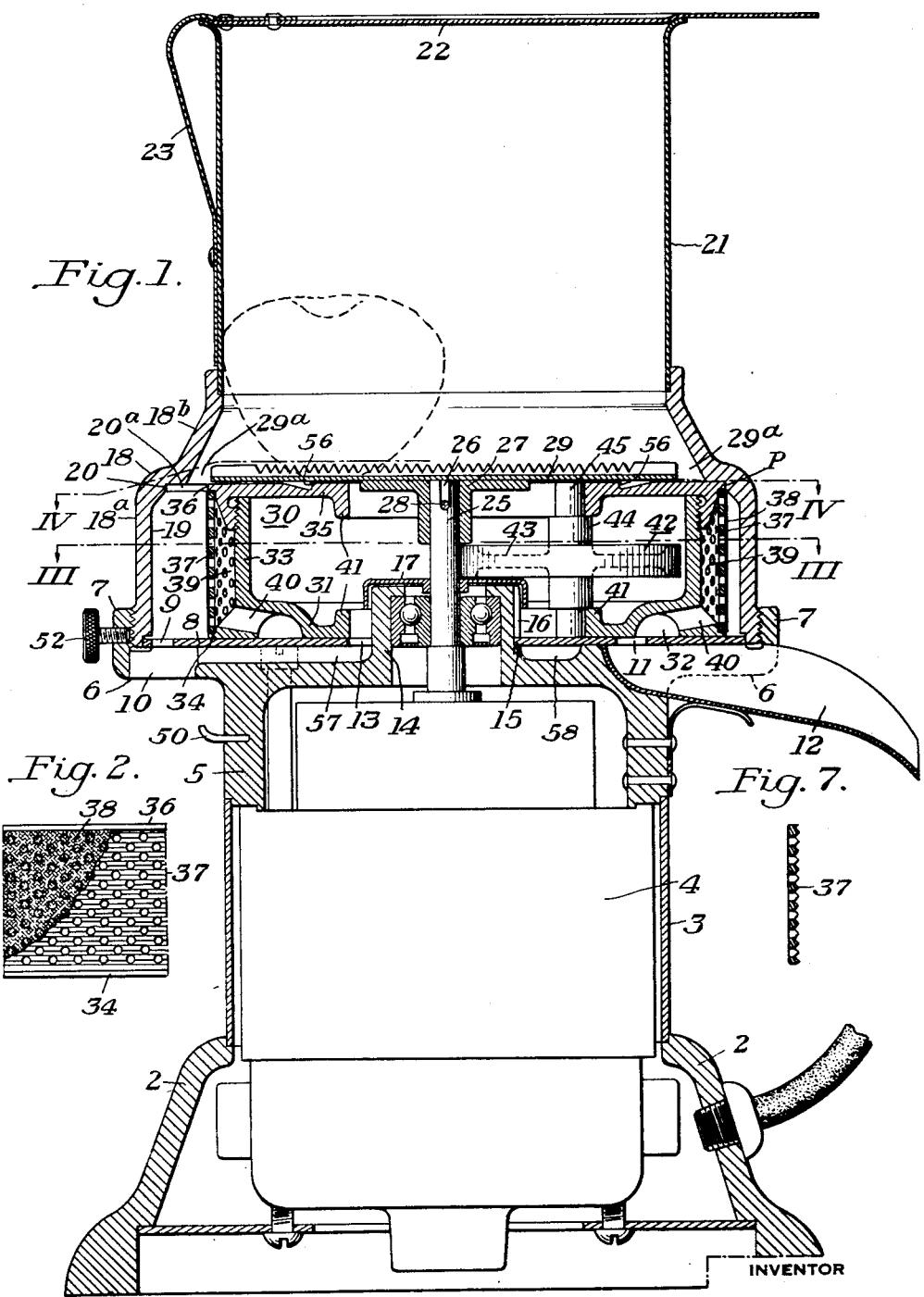

Patented Nov. 23, 1937

2,099,739

UNITED STATES PATENT OFFICE 2,099,739

EXTRACTION OF JUICE FROM VEGETABLE PULP AND LIKE MATERIALS

Clarence E. Jenkins, Keene, N. H., assignor, by direct and mesne assignments, to Bocjl Corporation, Trustee, Pittsburgh, Pa., a corporation of Delaware Application January 17, 1934, Serial No. 706,976

39 Claims. (Cl. 100—47)

This invention pertains to the extraction of juice from or dehydration of vegetable materials, and more particularly to an apparatus for effecting the separation of juice from such pulp.

The invention is particularly applicable to the extraction of juice from apples and like fruits and from vegetables, being less applicable to citrus and like fruits having thick rinds. The invention will be described primarily in connection with the extraction of juice from apples, but from the foregoing it will be understood that it is not restricted to apples, but includes various other fruits and vegetables and vegetable substances, or substances in the nature of a pulp. Feeding tests have proved that freshly extracted juice from apples is quite high in certain vitamins and other desirable properties, but as the juice ages, even though preserved, these properties are largely destroyed. The usual procedure in extracting the juice from the apples is to chop up large quantities of the apples and then press the resulting pulp. The juice or cider is then stored, usually for commercial purposes with a preservative and used for consumption at some time after it has been pressed. A considerable oxidation takes place in the pulp after the apples have been chopped up and while the cider is being extracted, with the result that the cider has a decided brown color. In pressing the fruit, efficient removal of the juices is not effected, and this removal of the juices is further hampered by reason of the fact that when the ruptured cells in the particles of fruit are exposed to the air the inherent pectin tends to seal the cells and make them gummy, thus further interfering with the extraction of the juice. Moreover, by this method of extraction the distinctive flavor, or bcquet that characterizes the original apple is entirely lost.

The present invention provides a device wherein the fruit may be disintegrated and immediately pressed so that the juice can be extracted before there is any oxidation and before the ruptured cells have a chance to heal themselves or form any sticky substance. An efficient and novel arrangement for pressing the pulp and extracting the juice is provided which is considerably more efficient than presses heretofore provided for the purpose.

The invention is especially adapted to be embodied in a small unit which can be distributed for domestic use and which can be used in eating places and refreshment stands, so that a customer may be served with freshly extracted juice in the same manner that he may now receive freshly extracted orange juice. The freshly extracted juice as thus served contains all of the original food and health properties of the fresh fruit, it is not discolored by oxidation, and the aroma or bcquet of the original fruit is carried over into the freshly extracted juice. The construction and arrangement of the apparatus is such that it can be easily operated and easily cleaned. At the same time its construction is extremely simple and it can be manufactured at a relatively low cost.

While the invention is especially applicable to small units for the dispensing of individual drinks of apple juice or other juice, the invention is such that its construction may be incorporated in larger units for the production of juice in bulk, and it may also be adapted to other commercial applications where juice or fluid is to be extracted from masses of vegetable material or other pulp.

In my copending application, Serial No. 483,932, filed September 23, 1930 now issued as Patent No. 1,953,714, dated April 3, 1934, I have shown a machine adapted for a similar purpose, wherein the juice is extracted by a centrifuging operation; and my copending application Serial No. 565,274, filed September 26, 1931, is also for a machine for a similar purpose wherein in the preferred form a continuous belt constitutes one of the pressing elements. While the devices shown in my copending applications operate satisfactorily, the present invention provides a machine of more simple construction and which is capable of being more easily cleaned.

The invention may be readily understood by reference to the accompanying drawings which illustrate two present preferred embodiments of my invention, and in which Figure 1 represents a transverse vertical section through a machine, the motor, however, being shown in elevation;

Figure 2 is a fragmentary view of a portion of one of the pressing surfaces, the fabric filter being broken away over a part of the surface;

Figure 3 is a horizontal section in substantially the plane of line III—III of Figure 1;

Fig. 4 is a similar staggered section in the plane of line IV—IV of Figure 1;

Figure 5 is a top plan view on a reduced scale of the bottom supporting plate;

Figure 6 is a top plan view on a reduced scale, of the disintegrating disc;

Figure 7 is a detail view showing one of the pressing surfaces in section, the pressing surface being shown detached from the remainder of the machine;

Figure 8 is a view similar to Figure 1, of a modified embodiment of the invention;

Figure 9 is a horizontal section in the plane of line IX—IX of Figure 8;

Figure 10 is a detail view showing one way of releasably attaching one part of the device to its supporting base;

Figure 11 is a detail view showing a modified form of cover, the view being a perspective view;

Figure 12 is a schematic view showing the manner in which the pulp is pressed; and Figure 13 is a fragmentary view representing a section in the line XIII—XIII of Figure 9.

Referring first to the embodiment of the machine illustrated in Figures 1 to 7, inclusive, 2 designates a supporting base having a casing 3 thereon within which is rigidly supported an electric motor 4 of any known or prefered construction, the motor preferably, in a small unit, being similar to universal electric motors frequently employed in household devices. The casing 3 supports a housing member 5 which housing member has a laterally extending portion 6 terminating in an upwardly extending annular flange 7. The flange 7 is preferably provided with an interior thread as shown. Resting on the top surface of the member 6 is a bottom plate 8, this plate forming the bottom of the pressing unit per se. It is provided with a hole 9 near its periphery, which hole registers with a hole 10 in the laterally extending part 6 of the member 5. The plate 8 is also provided with a hole 11 spaced further in toward the center, which hole is positioned over a spout member 12 removably supported in a suitably shaped recess in the member 5. The top edge of the spout 12 bears against the bottom of the plate 8. The spout 12 is adapted to receive juice which flows through the opening 11. The opening 9 is provided for the escape of pulp which has been pressed. The plate 8 may be held against rotation in any suitable fashion. I have shown the plate as being provided with a large central opening 13 which fits around the central hub portion 14 of the member 5, and which has a key 15 adapted to enter a vertically extending groove 16 in the hub. The hole 13 allows the bottom plate 8 to be removed over the guard or cap 17 on the top of the hub 14. At the same time, the tonge 15 entering the slot 16 serves to hold the plate 8 against rotation.

The hopper assembly is screwed into the flange 7 and has a lower casting 18, the bottom part of which is substantially cylindrical and the upper part of which is preferably tapered in as shown. The lower part of the member 18 has an internal cylindrical surface 19. The inwardly sloping upper part of the member 18 has a vertical shoulder at 20 and an overhang or horizontal shoulder 20a. Supported on the member 18 is a cylindrical hopper 21 which may be soldered or otherwise tightly joined to the member 18. In Figure 1, I have shown this hopper as being provided with a cover 22 carried on a spring clip 23, this spring clip providing in effect a hinge to enable the cover to be lifted up. At the same time, the spring holds the cover tightly closed when it is not being manually lifted.

The motor 4 is provided with a shaft 25 that projects up through the hub 14 and through the guard or cap 17 to a point above the lower portion 18a of the member 18. I have shown the end of the motor shaft as being slotted at 26. Fitted over the end of the motor shaft is a hub 27 having a transverse pin 28 therein which is received in the slot 26. The hub 27 carries a circular disc 29, the diameter of which is substantially the same or slightly greater than the inside diameter of the hopper 21. By reason of the outward slope of the portion 18b of the member 18, there is an annular space 29a between the periphery of the disc 29 and the inner surface of the portion 18b. I have shown the disc 29 as being provided with a diametrically extending serrated rib for effecting the disintegration of the fruit or other vegetable substance to be pressed. The disc 29 may be readily lifted off the end of the motor shaft, but the cross pin 28 in the slot 26 provides in effect a key for positively rotating the disc when the disc is in position on the end of the motor shaft. It will be seen that since the disc 29 is carried directly on the end of the motor shaft, it will rotate with the same speed as the motor, which is normally at the rate of several hundred and even thousand revolutions per minute. Below the disintegrating plate 29 and separate therefrom is the gyratory pressing element designated generally as 30. This gyratory pressing element has a circular bottom portion 31 in the bottom face of which is an annular groove 32. It is provided with a circular flange 33, the top of the flange 33 being externally threaded. On the periphery of the bottom portion 31 is an annular lip 34. Screwed to the threaded upper part of the flange 33 is a top member 35, the member 35 having a peripheral lip 36 thereon. Resting on the lip 34 and confined between the lips 34 and 36 is a perforated, rigid, metal ring or band 37. The outer surface of the band or pressing member 37 is preferably provided with small annular grooves. A filtering surface comprising a single thickness of silk fabric or other material is tightly fitted about the surface of the band 37. This filtering band is designated 38. It will be noted that the perforated metal band 37 is spaced outwardly from the flange 33, there being an intervening space 39. There are vertical shoulders on the members 31 and 35 back of the band 37 so that the band 37 must remain centered with respect to the member 30. A number of radial ports 40 lead from the space 39 into the annular groove 32.

The lower part 31 of the member 30 and the upper plate 35 are each provided with a central opening of considerably greater diameter than the hub portion 14 of the member 5. The members 31 and 35 are preferably provided with flanges 41 around this central opening.

Received within the member 30 is a single roller 42 having a large wheel portion 43, a hub 44, and a central axle or spindle 45. The diameter of the wheel portion 42 is slightly less than the distance from the outside of the motor shaft 25 to the inner surface of the flange 33. The periphery of the roller 42 bears against the outside of the motor shaft. The spindle portions 45 of the roller bear against the inner faces of the flanges 41 while the top and bottom of the hub portion 44 may engage the top edges of the flanges 41 to prevent vertical displacement of the roller. It will be observed by reference to Figure 12 that the distance from the center of the shaft 25 to the center of the spindle 45 is greater than the radial distance from the center (C) of curvature of the circular flanges 41 to the inside surfaces of the flanges 41. In Figure 12 the former distance is designated X and the latter distance is designated Y. The result of this is that the center of the roller 45 must always be offset with respect to a radius drawn from the center of the shaft 25 to the nearest point of tangency of the band 37 to the inner surface of portion 18a of member 18. This radius is indicated in Figure 12 by the dotted line $r$.

It will also be observed that the gyratory roller unit may move in or out along the radius $r$, if the angularity of line X is increased with respect to $r$. This is indicated in Figure 12 where $r'$ represents a radius of less eccentricity for the gyratory roller unit, the line X being displaced to position X'. This is a diagrammatical rather than an actual showing.

From what has previously been said, it is apparent, as shown in Figures 3 and 12, that the roller 42 interposed as it is in this position, causes the gyratory pressing member 30 to be eccentric with respect to the cylindrical portion 18a of the member 18 within which it is housed.

When the motor shaft 25 is rotating, the frictional engagement between the shaft and the periphery of the wheel portion 43 of the roller 42 causes the roller 42 to rotate about its own axis. At the same time, the spindle portions 45 rotating on the inner surface of the flanges 41 serve to cause the roller 42 to travel in a planetary fashion around the shaft 25 and at the same time it imparts a rotary motion to the gyratory pressing assembly 30. Since the line of centers between the shaft 25 and the axis of the roller 42 can never coincide with the radius r, the tendency of the roller is to continually exert an outward pressure on the member 30 as it travels in its planetary path about the shaft 25.

It will be noted in Figure 1 and also in Figure 4 that where the outer surface of the member 37 is closest to the inner surface of the portion 18a, the top plate 35 with its lip 36 comes against the shoulder 20 as indicated at point P in Figure 1, while there is a crescent shaped opening between the remaining portion of the periphery of member 37 and the inner wall of member 18. This crescent shaped opening may be seen in Figure 4 as being appreciably visible, beginning with point $P^2$ and increasing to a maximum distance at the point $P^3$ diametrically opposite the point P, and then diminishing again toward the point P, there being no appreciable opening beyond the point $P^4$.

In the operation of the machine, it may be assumed that the motor is operated at high speed, the shaft 25 rotating in a counter-clockwise direction as indicated by the arrow in Figure 3. The disintegrating disc 29 is rotated at the same high speed. At the same time, the roller 42 is caused to rotate in a clockwise direction due to the frictional engagement between the periphery 43 of this roller and the shaft. The roller 42 rotates at a very much lower speed due to the large peripheral diameter of the roller as compared with the small diameter of the shaft 25. At the same time, spindle portions 45 of the roller rotating in a clockwise direction in contact with the inner surfaces of the flanges 41, tend to cause the roller 42 to travel in a planetary path in an anticlockwise direction about the shaft 25. This motion takes place relatively slowly due to the small diameter of the spindle portions 45 and the relatively large internal diameter of the flanges 41. The effect of this is to impart a gyratory motion or eccentric shifting motion to the entire assembly 30. At the same time, the assembly 30 is rotated through the same action in a clockwise direction about its own axis. It thus has a rolling gyratory movement inside the portion 19 of the member 18.

Assuming the motor to be in operation, the cover 22 is lifted and an apple is dropped into the hopper 21. Due to the high speed of rotation of the disc 29 and the inertia of the apple, the apple is very quickly torn to a fine pulp, but a few seconds being required to completely disintegrate the apple. As the apple is disintegrated, the pulp is thrown out centrifugally into the space 29a around the outside of the disc 29. From here it drops or falls or is forced by its momentum into the crescent shaped opening $P^2$—$P^3$—$P^4$ (see Fig. 4) around the outside of the gyratory unit 30. It is, of course, obvious that as the member 30 is continuously moving, the crescent shaped opening is continually shifting progressively around the interior of the press. When the top edge of the upper plate 35 of the gyratory member 30 moves under the overhang 20a, it serves to shear or crush any particles of pulp or skin that may have become lodged at this point. The gyratory motion of the inner unit 30 quickly presses the pulp out against the inner face of portion 18a of member 18, building up a layer of pulp around the inside surface of the portion 18a. As new pulp continues to be discharged into the space between the two pressing surfaces, it is pressed outwardly. The escaping juice is forced through the filtering surface 38 and through the holes in the rigid pressing band 37 into the space 39. From this space it flows through the radial passages 40 into the annular channel 32 and eventually flows out through the discharge opening 11 into the spout 12. It will be seen that at the point P where the pressing surface is in closest proximity to the outer wall 18a, the greatest amount of work is being done.

As shown in the diagram of Figure 12, however, some pressing action is taking place in advance of the two points of nearest contact. The outside diameter of the gyratory pressing unit 30 is relatively large with respect to the inside diameter of portion 18a so that the effective pressing surfaces are relatively long. As viewed in the diagram of Figure 12, the area over which substantial pressing action is taking place may extend over an arc approximating the arc K. The pulp under pressure tends to flow in all directions. It is substantially confined, however, in the zone where the greatest work is being done, against upward movement by reason of the top of the gyrating member 30 extending for a considerable portion of its periphery under the shoulder or overhang 20a. The pulp is confined against downward movement by the bottom plate 8. Where the opening 9 is provided, the pulp is not confined against downward movement, with the result that when the point of pressure comes over the opening 9, pulp will be forced downwardly through the opening 9. Each time the point of pressure comes over the opening 9, a small pellet or wad of pulp is forced through this opening. It is packed so tightly that it does not fall clear of the opening until the next time the point of pressure comes over the opening, at which time one pellet or wad of pulp is replaced by the next one, the displaced one falling through the opening 10. A hook 53 may be provided, to which a paper bag can be hung to collect the dehydrated pulp. Were it not for the fact that compressed dry pulp is thus wadded into the opening 9, some of the juice might escape through this opening. In actual operation, however, the pulp wedges so tightly into the opening 9 that it effectively seals the opening against loss of juices. As the pulp is removed adjacent the point 9, the gyrating pressing element tends to continuously work the band of pulp around on the inside of the cylindrical portion 18a of the casing, the pulp progressively working around in this manner to the point of discharge. It is, of course, apparent that new pulp is being added from the disintegration of the apple, to the band of pulp forming against the inner surface of portion 18a. As the new pulp, is pressed out against the accumulating band of old pulp, the juice is forced in through the filter and perforations, and, having been pressed in this way for removal of juices, it also becomes old pulp and works around to the discharge.

While the detailed description of the cycle of operation as above set forth is quite involved, the actual time required to completely disintegrate an apple and extract the juice therefrom is but a few seconds, it being possible to disintegrate several average sized apples in a minute. The juice comes out of the spout 12 as substantially clear juice, being filtered through the silk fabric 38. The entire operation takes place before there can be any appreciable oxidation of the fruit or of the juice. The juice is not, therefore, discolored and it contains the original aroma and boquet of the apple. A surprising degree of dehydration is obtained, the pulp being quite dry and the juice being more effectively removed than it is in ordinary cider presses.

It will be seen that as the thickness of the mass of pulp on the inner cylindrical surface of portion 18a increases, the angular distance between the radius $r$ from the center of the shaft to the point of nearest contact with the outer pressing surface and the line of centers between the shaft and the roller increases, decreasing the eccentricity of the inner pressing member with respect to the outer one. Variable travel of the gyratory pressing roll or unit 30 is thus automatically obtained and the work being done is more or less automatically adjusted to the resistance which the press roll encounters. This is explained by Figure 12 where the distance $r$ is reduced to $r'$.

In Figure 1, I have shown a set screw 52 for engaging the threaded portion of the part 18 to prevent this part from being removed or from turning during the operation of the machine. To clean the machine after it has been operated, it is merely necessary to loosen the screw 52, unscrew the member 18 and lift it clear of the machine. After this has been done the plate 29 can be lifted off, after which the gyratory pressing roll assembly 30 with its roller 42 can be lifted off. The bottom plate 8 can be then lifted out and the spout 12 can be removed. All of these parts can be quickly rinsed off and re-assembled with very little difficulty. The device thus provides a very simple and efficient form of juice extracting device which can be made in small units and is suitable for both domestic purposes and for drinking fountains and like places desiring to serve the apple juice as a beverage. The device is more applicable to the extraction of juice from apples and fruits having a like thin skin than it is for citrus fruits, due to the fact that citrus fruits have skins of considerable thickness which would have to be first disintegrated and the skins of which do not yield juice. As a general rule, existing reaming devices and squeezers are more desirable for citrus fruits. It may be mentioned, however, that tomatoes and other vegetables can be very effectively pressed in the machine.

There is a very definite advantage in having the diameter of the gyratory pressing roll assembly such that a valve action is produced by the edge of the roll passing under the overhanging shoulder 20a of the part 18. It not only prevents the pulp from being forced or extruded upwardly in the area where the maximum work is being done, but it prevents fresh pulp and juice from being discharged directly into the pulp which is under pressure. In addition to this, it has a very definite shearing action on the particles which might otherwise tend to become lodged in the machine. Moreover, it will be observed that the direction of rotation of the disintegrating disc 29 with reference to the direction of movement of the gyratory roll is such that stems and other heavy particles are generally discharged into the crescent shaped opening around the periphery of the pressing roll at a point where the crescent is opening rather than where it is closing.

It will be noted that the disintegrating disc 29 moving at a high speed must be clear of the top surface of the gyratory roller assembly which is moving at a relatively much lower speed and in an opposite direction. The length of the shaft 25 is such that there is a very slight space between the top of the plate 35 of the gyratory roller unit and the plate 29. This leaves a path open for unfiltered juice to flow under the plate 29. To avoid this, an annular feathered slot 56 is formed on the top surface of the member 35, the long slope of the slot being directed outwardly toward the periphery of this member 35. The rapidly revolving disc 29 exerts a blower action, tending to exhaust air from the interior of the gyratory pressing roll unit and expelling it in the slight clearance space between the top surface of member 35 and the bottom surface of member 29. Utilizing this blowing action in conjunction with the feathered groove, juice which tends to creep under the plate 29 is blown out. In order that this blowing action may be effective, it is necessary that there be a free flow of air into the interior of the gyrating roller assembly and out of the hopper. In order to assure this, there is a lateral trough or groove 57 in the top surface of the member 5 leading from the opening 10 to an annular trough 58 around the hub 16. Air may flow from this annular trough 58 up through the large opening 13 in the bottom plate 8 into the interior of the pressing roll assembly and it can escape from the hopper around the lid or while the lid is lifted to insert additional fruit, the groove 56 serving as a reservoir to collect the juice that creeps under the disc while the cover is closed and in the event that there is insufficient draft to expel the juice.

The construction of the pressing roll assembly is such that it may be readily taken apart when this is desired. By unscrewing the top plate 35 from the vertical flange portion 30, the perforated pressing band 37 can be easily removed.

It might be expected that the pulp would cling to the periphery of the gyrating pressing roll unit 30 instead of to the interior cylindrical surface of the portion 18a. Such, however, is not the case, due probably to the fact that the inner surface of portion 18a being circular presents a concave surface, whereas the periphery of the roller presents a convex surface, and there is a greater surface area for the pulp to accumulate against in the concave interior of portion 18a than there is on the convex exterior of the gyratory pressing roll.

The modification shown in Figures 8, 9, and 10 is for an arrangement wherein the perforated filter surface is stationary and the imperforate surface moves. It is, therefore, essentially a reversal of the arrangement first described. In these figures, I have also shown an improved form of cover, which cover is shown in detail in Figure 11. The cover will hereinafter more fully be described. It may be used either with the hopper of the structure shown in Figure 1 or the hopper of the structure shown in Figure 8.

In Figure 8, I have illustrated only the upper part of the machine, the base and the lower part of the motor not being illustrated inasmuch as these may be essentially the same as shown in Figure 1. In the construction shown in Figures 8 and 9, the upper end of the driving motor is indicated at 60, and 61 is the motor shaft. Surrounding the motor and enclosing the same is a member 62 corresponding to the member 5 of Figure 1, the member 62 having an outwardly extending portion 63 in which is a peripheral channel 64. Centrally positioned on the member 62 is a hub 65. Resting on top of the member 62 is a plate 66 which is generally similar to the plate 8 of Figure 1 and which may be held against rotation in the same way that plate 8 is held against rotation. The plate is provided with an annular trough or channel 67 close to its periphery. There is a pulp discharge opening 68 in this plate, this opening being positioned over a pulp discharge passage 69 corresponding to the opening 10 of Figure 1.

A casing member 70 is supported on the member 62, this member having an internal shoulder 71 which rests on the top of the plate 66 to limit the downward movement of the member 70 with respect to the member 62. The member 70 may be attached to the member 62, by a threaded engagement as illustrated in Figure 1, more preferably by the use of one or more set screws as shown in Figure 10.

In Figure 10 there is shown a set screw or thumb screw 72 which is threaded through an opening in the casing 70 and which has a tapered end portion 72a that enters the annular trough 64. The tapered end 72a engaging the tapered walls of the channel 64, tends to rigidly hold the member 70 in position on the supporting member 62, at the same time clamping the plate 68 in place. To remove the member 70 it is merely necessary to retract the screw 72. The member 70 is provided with an internal annular shoulder 73. A circular, rigid, perforated band 74 is located in the member 70, the bottom edge of this ring or band 74 being received in the annular groove 67 while the top edge is engaged by the shoulder 73. The band is therefore held against vertical movement and against lateral or radial movement. There is an open space 75 between the outside of the circular member 74 and the interior of the member 70. The member 70 is also provided with a second shoulder 76 located above shoulder 73. Above the shoulder 76 the member 70 decreases in diameter to the diameter of the hopper 77 which is supported by it.

The grinding or distintegrating disc 78 is mounted on the end of the shaft 61, the construction and arrangement being similar to that of the disc 29 in Figure 1. Below the disc 78 is the gyratory pressing roll unit designated generally as 79. It may be in the form of an integral piece, having a bottom portion 80, a top portion 81 and a vertical side wall 82, the periphery of which forms the pressing surface. A small lip or flange 83 is preferably provided around the top of this member for cooperation with the shoulder 76 to produce the valve and shear action described in connection with Figure 1. The bottom and top portions 80 and 81 have a central opening 84 therein, there being an annular surface or track 85 forming the perimeter of this hole. A roller 86 is received within the hollow interior of the unit 79. Its periphery bears against the shaft 61 while its spindles 87—87 roll on the surfaces 85.

A filtering surface of fabric is preferably secured over the inner face of the member 74. This fabric may have its top edge confined under the shoulder 73 and its bottom edge received in the trough 67 so as to be clamped over the inner surface of the foraminated or articulated member 74. For clearness of illustration I have shown only a fragment of this fabric in Figure 7, the fabric or filter being designated 88.

The operation of the unit is much the same as that described in Figure 1, the fruit being disintegrated in the same manner. There is a continually shifting crescent opening between the lip 83 and the inside of the member 77 through which the fresh pulp can be discharged into the space between the roller and the perforated pressing surface 74. The pulp is rolled and squeezed in the same way, the juice being forced through the perforated wall 74 where it collects in the space 75 and flows around to the outlet spout 89. The pulp is discharged in wads through the opening 68, and as described in connection with Figure 1, the area of this opening is so regulated that a wad of pulp always remains in the opening until another wad replaces it, thus sealing the opening against the escape of juice.

In this form of the device, as in the construction described in connection with Figure 1, the roller unit 79 is rotated and gyrated through the planetary travel of the roller 86. The same valve action occurs in the pressing zone by reason of the cooperating lip 83 and the shoulder 76. The device can be readily taken apart for cleaning, and in other respects it possesses the advantages of the construction shown in Figure 1. The same provision is made in this device as is shown in Figure 1, for preventing the juice from working back under the disintegrating disc 78, there being an open air passage from the discharge opening 69 to the interior of the pressing roller unit 79, so that the blower action of the member 78 may be utilized.

In the construction shown in Figure 8 I have shown a form of cover for the hopper somewhat different from that shown in Figure 1. This cover is shown in detail in Figure 11. This cover, designated generally as 90, is somewhat dished and is adapted to fit down into the interior of the hopper 77. Depending from the cover is a plurality, preferably three, rods 92 so positioned that they just touch the inner wall of the hopper 77. The cover has a close enough fit so that it will prevent juice or bits of pulp from flying out of the hopper, but it is loose enough so that it may rotate readily on the top of the hopper. When the disintegrating disc 78 is revolving at high speed, bits of the apple or other pulp and juice fly up onto the smooth walls of the hopper 77. The rods 92 project sufficiently far down into the hopper to just clear the grinding disc so that they may be struck by the apple as the apple is being moved around during the process of its disintegration. The contact of the apple with these rods serves to rotate the cover. The rods scrape off bits of pulp that accumulate on the side walls of the hopper and as the pulp is knocked loose by these rods, it falls down to the disintegrating disc. In this way, the cover provides a means for preventing the accumulation of pulp on the interior wall of the hopper. In using the machine, the cover is merely lifted high enough above the top of the hopper to permit an apple to be inserted between two of the legs or rods 92, the lower ends of these rods or legs not being lifted clear of the hopper. The apple inserted in this way is dropped and the cover is then allowed to drop. Obviously, this cover could also be substituted for the one shown in Figure 1.

While I have described my invention particularly in connection with the grinding of vegetable substances and the subsequent extraction of juices, it will be understood that in some cases the grinding disc may be omitted and the mechanism used merely as a press. Moreover, insofar as the mechanism for effecting gyratory movement of the movable pressing roller unit is concerned, it will be understood that the mechanism may be adapted to other appliances than presses. It will be further understood that the specific constructions herein illustrated and described merely disclose the present preferred embodiments of my invention, and that the invention may be otherwise embodied and various changes and modifications may be made therein under the contemplation of the following claims.

I claim:

1. Apparatus of the class described comprising inner and outer cylindrical members one of which is eccentrically positioned within the other, and means for moving one of said members in a gyratory path with respect to the other, one of said members having a wall portion over which the other member moves and which serves to confine material to be squeezed between the two members, and an open space being provided through which material to be squeezed may be introduced between the said inner and outer members.

2. Apparatus of the class described comprising inner and outer cylindrical members one of which is eccentrically positioned within the other, and means for moving one of said members in a gyratory path with respect to the other, the inner member having a diameter substantially greater than the radius of the outer member, one of said members having a wall portion over which the other member moves and which serves to confine material to be squeezed between the two members, and an open space being provided through which material to be squeezed may be introduced between the said inner and outer members.

3. Apparatus of the class described comprising inner and outer cylindrical members one of which is eccentrically positioned within the other, and means for moving one of said members in a gyratory path with respect to the other, the other of said members being fixed, the inner member having a diameter substantially greater than the radius of the outer member, one of said members having a foraminous wall to enable juice to pass therethrough, one of said members having a wall portion over which the other member moves and which serves to confine material to be squeezed between the two members, and an open space being provided through which material to be squeezed may be introduced between the said inner and outer members.

4. A juice extracting apparatus of the class described comprising inner and outer cylindrical members one of which is eccentrically positioned with respect to the other, means for moving one of said members in a gyratory path with reference to the other, a plate against one face of said members to confine the pulp between the two members, and means at the opposite face of said members overhanging a portion only of the side faces of both members, said means providing with said members a crescent shaped opening around the remainder of the periphery of one of the members, and one of said members having a foraminous wall through which juice may be pressed.

5. A juice extracting apparatus of the class described comprising inner and outer cylindrical members one of which is eccentrically positioned with respect to the other, means for moving one of said members in a gyratory path with reference to the other, a plate against one face of said members to confine the pulp between the two members, and means at the opposite face of said members overhanging a portion only of the side faces of both members, said means providing with said members a crescent shaped opening around the remainder of the periphery of one of the members, one of said members having a foraminous wall through which juice may be pressed, and said plate having an opening therein through which pulp may be intermittently extruded during the operation of the press.

6. Apparatus of the class described comprising inner and outer cylindrical members, the inner one of which is eccentrically positioned within the outer one, means for moving the inner member in a gyratory path inside the outer member, a hopper cooperating with the outer member, and a disintegrating disc positioned over the face of the inner member, there being a space between the walls of the hopper and the periphery of said disc through which pulp may be discharged into the space between the two members.

7. Apparatus of the class described comprising inner and outer cylindrical members, the inner one of which is eccentrically positioned within the outer one, means for moving the inner member in a gyratory path inside the outer member, a hopper cooperating with the outer member, and a disintegrating disc positioned over the face of the inner member, there being a space between the walls of the hopper and the periphery of said disc through which pulp may be discharged into the space between the two members, one of said members having a foraminous wall for cooperation with the surface of the other member, and said hopper having a shoulder portion adapted to overhang a portion only of the periphery of said inner member adjacent the point where the inner member is closest the outer member.

8. Apparatus for extracting juice from pulp and the like, comprising eccentrically arranged members one of which is within the other, means for effecting the gyratory movement of one of said members with respect to the other, the inner face of the outer member and the outer face of the inner member comprising cooperating pressing surfaces, the pressing surface of one of said members being foraminous, a filtering band covering the foraminous pressing surface, and means on opposite sides of said members for confining pulp between the two members against displacement in an axial direction around at least a portion of the peripheries of the two members.

9. Apparatus for extracting juice from pulp and the like, comprising eccentrically arranged members one of which is within the other, means for effecting the gyratory movement of one of said members with respect to the other, the inner face of the outer member and the outer face of the inner member comprising cooperating pressing surfaces, the pressing surface of one of said members being foraminous, a filtering band covering the foraminous pressing surface, and means on opposite sides of said members for confining pulp between the two members against displacement in an axial direction around at least a portion of the peripheries of the two members, said means comprising a plate against one surface of the inner member and an annular shoulder on the outer member which overhangs that portion of the eccentric inner member which is closest to the outer member.

10. Apparatus of the class described comprising a hopper having a cylindrical chamber of increased diameter at the bottom thereof, an eccentric pressing unit in said chamber in the form of a cylindrical roller arranged to travel about the interior of the chamber in a gyratory orbit, the walls of the chamber having an overhanging portion under which a portion of the cylindrical roller is adapted to project, the diameter of the roller member being such that a portion of its surface is always clear of the overhanging portion whereby there is a crescent shaped opening between the hopper and the inner wall of the chamber around a portion of the periphery of the roller unit, and means for rotating and simultaneously imparting a gyratory motion to the pressing unit.

11. Apparatus of the class described comprising a hopper having a cylindrical chamber of increased diameter at the bottom thereof, an eccentric pressing unit in said chamber in the form of a cylindrical roller, the walls of the chamber having an overhanging portion under which a portion of the cylindrical roller is adapted to project, the diameter of the roller member being such that a portion of its surface is always clear of the overhanging portion whereby there is a crescent shaped opening between the hopper and the inner wall of the chamber around a portion of the periphery of the roller unit, and a disintegrating disc in a plane immediately above the roller unit and of a diameter slightly less than the diameter of the hopper in this plane whereby there is an annular space through which pulp may discharge from the edge of the disintegrating disc into said crescent shaped opening.

12. Apparatus of the class described comprising a hopper having a cylindrical chamber of increased diameter at the bottom thereof, an eccentric pressing unit in said chamber in the form of a cylindrical roller, the walls of the chamber having an overhanging portion under which a portion of the cylindrical roller is adapted to project, the diameter of the roller member being such that a portion of its surface is always clear of the overhanging portion whereby there is a crescent shaped opening between the hopper and the inner wall of the chamber around a portion of the periphery of the roller unit, a disintegrating disc in a plane immediately above the roller unit and of a diameter slightly less than the diameter of the hopper in this plane whereby there is an annular space through which pulp may discharge from the edge of the disintegrating disc into said crescent shaped opening, a common driving means for the roller unit and the disintegrating unit, and means for driving the roller unit at a speed considerably lower than the speed at which the disintegrating disc is rotated.

13. Apparatus of the class described comprising a hopper having a cylindrical chamber of increased diameter at the bottom thereof, an eccentric pressing unit in said chamber in the form of a cylindrical roller, the walls of the chamber having an overhanging portion under which a portion of the cylindrical roller is adapted to project, the diameter of the roller member being such that a portion of its surface is always clear of the overhanging portion whereby there is a crescent shaped opening between the hopper and the inner wall of the chamber around a portion of the periphery of the roller unit, and a disintegrating disc in a plane immediately above the roller unit and of a diameter slightly less than the diameter of the hopper in this plane whereby there is an annular space through which pulp may discharge from the edge of the disintegrating disc into said crescent shaped opening, said chamber and said roller unit having cooperating annular pressing surfaces one of which is foraminous.

14. In a mechanism of the class described, a cylindrical chamber, a central shaft, an eccentric member having a central opening therethrough in the chamber, said opening being of considerably greater diameter than the diameter of the shaft, the shaft extending through the opening, and a roller for operating the eccentric member having a peripheral portion of large diameter which engages the shaft, and having another portion of smaller diameter bearing against the inner surface of the opening in said member.

15. In a mechanism of the class described, a cylindrical chamber, a central shaft, an eccentric member having a central opening therethrough in the chamber, said opening being of considerably greater diameter than the diameter of the shaft, the shaft extending through the opening, and a roller for operating the eccentric member having a peripheral portion of large diameter which engages the shaft and having another portion of smaller diameter bearing against the inner surface of the opening in said member, the line of centers between the shaft and the roller being angularly displaced with respect to the radius leading from the center of the shaft to the point where the periphery of said eccentric member is closest the inner wall of said chamber.

16. In a mechanism of the class described, a member having a cylindrical chamber therein, a driving shaft centrally positioned in said chamber, a pressing roller unit around the shaft inside the chamber, and a planetary roller for transmitting motion from the shaft to the pressing roller unit, said chamber and said pressing roller unit having cooperating pressing surfaces one of which is perforated to permit the passage of juice therethrough.

17. In a mechanism of the class described, a member having a cylindrical chamber therein, a driving shaft centrally positioned in said chamber, a pressing roller unit around the shaft inside the chamber, a planetary roller for transmitting motion from the shaft to the pressing roller unit, said chamber and said pressing roller unit having cooperating pressing surfaces one of which is perforated to permit the passage of juice therethrough, and a plate member at one face of said eccentric pressing roller unit for confining pulp in the space between the two pressing surfaces, said first member having an annular shoulder which overhangs a portion only of the periphery of the eccentric pressing roller unit.

18. In a mechanism of the class described, a member having a cylindrical chamber therein, a driving shaft centrally positioned in said chamber, a pressing roller unit around the shaft inside the chamber, a planetary roller for transmitting motion from the shaft to the pressing roller unit, said chamber and said pressing roller unit having cooperating pressing surfaces one of which is perforated to permit the passage of juice therethrough, and a plate member at one face of said eccentric pressing roller unit for confining pulp in the space between the two pressing surfaces, said first member having an annular shoulder which overhangs a portion only of the periphery of the eccentric pressing roller unit, and the pressing roller unit and said shoulder being so positioned that the part of the pressing roller unit which is under the shoulder slides against and bears against said shoulder.

19. In a mechanism of the class described, a member having a cylindrical chamber therein, a driving shaft centrally positioned in said chamber, a pressing roller unit around the shaft inside the chamber, a planetary roller for transmitting motion from the shaft to the pressing roller unit, said chamber and said pressing roller unit having cooperating pressing surfaces one of which is perforated to permit the passage of juice therethrough, a plate member at one face of said eccentric pressing roller unit for confining pulp in the space between the two pressing surfaces, said first member having an annular shoulder which overhangs a portion only of the periphery of the eccentric pressing roller unit, and a disintegrating disc on the end of said shaft opposite said plate connected with the shaft for rotation therewith.

20. A juice extractor of the class described, comprising a casing having a gyratory pressing roller unit therein adapted to cooperate with a portion of the interior of said casing, said casing and said roller unit having cooperating pressing surfaces one of which is foraminous, a disintegrating disc in the casing immediately above the eccentric pressing roller unit and so positioned that pulp discharged from the periphery thereof may fall into the space between the pressing roller unit and the portion of the casing with which the pressing roller unit cooperates, and a hopper above the disintegrating disc for holding an article to be disintegrated.

21. A juice extractor of the class described, comprising a casing having a gyratory pressing roller unit therein adapted to cooperate with a portion of the interior of said casing, said casing and said roller unit having cooperating pressing surfaces one of which is foraminous, a disintegrating disc in the casing immediately above the eccentric pressing roller unit, a hopper above the disintegrating disc for holding an article to be disintegrated, a common driving means for the pressing roller unit and the disintegrating disc comprising a motor shaft on which the disintegrating disc is carried, and a planetary roller bearing against the motor shaft and against a surface of the pressing roller unit.

22. A juice extractor of the class described, comprising a casing having a gyratory pressing roller unit therein adapted to cooperate with a portion of the interior of said casing, said casing and said roller unit having cooperating pressing surfaces one of which is foraminous, a disintegrating disc in the casing immediately above the eccentric pressing roller unit and so positioned that pulp discharged from the periphery thereof may fall into the space between the pressing roller unit and the portion of the casing with which the pressing roller unit cooperates, a hopper above the disintegrating disc for holding an article to be disintegrated, means for rotating the disintegrating disc, and a cover for the hopper having rods thereon projecting down into the hopper and terminating close to the disintegrating disc, the rods being positioned to move against the inside walls of the hopper whereby the article being disintegrated will strike the rods to rotate the cover and dislodge material accumulated on the inner walls of the hopper and cause it to fall into said space between the pressing roller unit and the casing.

23. An apparatus of the class described having a hopper and a disentegrating disc at the bottom of the hopper, and having a pressing unit below the disentegrator disc for which the disintegrator disc forms a revoluble closure, means for rotating the disc at high speed, and a rotatable cover for the hopper, the cover having means adapted to wipe against the inner walls of the hopper to knock loose the material that is lodged on the walls by the disc and cause it to drop to a position where it can fall into the pressing unit.

24. A mechanism of the class described having a cylindrical hopper and a disintegrating disc adjacent the bottom of the hopper, and having a pressing unit below the disintegrator disc for which the disintegrator disc forms a revoluble closure, means for rotating the disc at high speed, and a cover having spaced rods thereon projecting down into the hopper adapted to be engaged by an article in the hopper being disintegrated, said rods contacting with the inner walls of the hopper, and said rods being adapted to knock loose that material which is lodged against the walls by the disintegrator disc and cause it to fall into the pressing unit.

25. An apparatus of the class described having a gyratory pressing roller unit and a disintegrating disc rotatable at a speed relatively higher than the speed of movement of the gyratory pressing roller unit, which disc is in close proximity to the surface of the gyratory pressing roller unit, and common driving means for the disintegrating disc and the gyratory pressing roller unit, said gyratory pressing roller unit having an outwardly feathered groove therein whereby air moving from the center of the under face of the disc toward the periphery thereof may be utilized to expel juice from the space between the disc and the surface of the gyratory pressing roller unit, said apparatus having a passage to permit the free flow of air to the interior of said pressing roller unit.

26. Apparatus of the class described comprising inner and outer cylindrical members one of which is eccentrically positioned with respect to the other, means for moving one of said members in a gyratory path with respect to the other, the other of said members being relatively fixed, means at the bottom of one member with which the other member has sliding engagement to confine material to be pressed between said members, and means for directing material to be squeezed between the two members.

27. Apparatus for extracting juice from pulp or the like, comprising inner and outer cylindrical press members, the inner of which is eccentrically positioned in the outer so that there is a substantially crescent shaped chamber between the press members, means for imparting a rolling gyratory motion to one of said members, the other member being stationary whereby said chamber progressively follows around with the travel of said rolling press member, and means for discharging material into said crescent shaped chamber in an axial direction and as the chamber moves around.

28. An apparatus of the class described comprising a fixed outer press member having a cylindrical interior chamber, an inner pressing member in said chamber arranged to roll around therein an orbit about the center of the outer member, a disintegrator above the inner pressing member arranged to disintegrate fruit and the like and deliver the resulting pulp and juice to the interior of said chamber, a drive shaft for the disintegrator passing through the inner pressing member, and a planetary drive housed within said inner pressing member for operating it from said drive shaft at a speed less than the speed at which the shaft and the disintegrator are driven.

29. A juice extractor comprising eccentric pressing members one within the other, a disintegrator above the pressing members arranged to disintegrate fruit and discharge the resulting pulp into the interior of the outer of said pressing members, a driving motor, a drive shaft passing through the inner pressing member and connected to the disintegrator to drive it, and means inside the inner pressing member providing a speed-reducing drive between said shaft and inner pressing member and through which said inner pressing member is driven.

30. A juice extractor comprising a stationary outer member having a cylindrical interior chamber the walls of which provide a pressing surface, a cylindrical pressing member in said chamber movable in an orbit about the interior of said chamber, a fixed driving shaft passing through said chamber and through said inner member, and means carried inside said inner member providing a planetary drive by means of which the inner member is caused to roll about the interior of said chamber in an orbit.

31. A juice extractor comprising a stationary outer member having a pressing surface, a cylindrical pressing member in said chamber movable in an orbit about the interior of said chamber, a fixed driving shaft passing through said chamber and through said inner member, and means carried inside said inner member providing a planetary drive by means of which the inner member is caused to roll about the interior of said chamber in an orbit, said means providing a planetary drive being angularly displaceable with respect to the center of said chamber, and permitting of radial movement of said inner member with respect to the center of the chamber in the outer member.

32. Apparatus of the class described comprising inner and outer cylindrical members one of which is eccentrically positioned within the other, means for moving one of said members in a gyratory path with respect to the other, the other of said members being fixed, the inner member having a diameter substantially greater than the radius of the outer member, one of said members having a wall structure providing a combined pressing and filtering surface, and means providing an end plate for closing the bottom of the space between the two members, said last named means having openings therein at different distances from the center thereof for the separate discharge of juice and pulp.

33. Apparatus for extracting juice from pulp and the like comprising eccentrically arranged members, one of which is within the other, means for effecting the gyratory movement of one of said members with respect to the other, the inner face of the outer member and the outer face of the inner member comprising cooperating pressing surfaces, the pressing surface of one of said members being foraminous, and means providing an end plate for closing the bottom of the space between the two members and confining the pulp being treated therebetween, said pulp being introduced into the space between said inner and outer members from above said members.

34. Apparatus for extracting juice from pulp and the like, comprising eccentrically arranged members, one of which is within the other, means for effecting the gyratory movement of one of said members with respect to the other, the inner face of the outer member and the outer face of the inner member comprising cooperating pressing surfaces, the cooperating surface of one of said members being a combined pressing and filtering surface, and means providing an end plate for closing the bottom of the space between the two members and which serves to confine material to be squeezed between said two members, said material being introduced into the space between said two members from above said members.

35. In a mechanism of the class described, a member having a cylindrical chamber therein, a driving shaft centrally positioned in said member, a pressing roller unit around the shaft inside the chamber, and a planetary roller shiftable under load to vary the eccentricity of the pressing roller unit and which transmits motion from the shaft to the pressing roller unit.

36. Apparatus of the class described, comprising inner and outer cylindrical press members, one of which is eccentrically positioned with respect to the other, means for imparting an orbital travel to one of said members, and means at the bottom of one of said members over which the other member has a sliding contact for confining material to be pressed between the two members.

37. Apparatus of the class described comprising inner and outer cylindrical pressing members eccentrically positioned with reference to each other, means for imparting an orbital travel to one of said members, the other of said members being stationary, and means at the bottom of one member over which the other member has a sliding contact for confining material to be pressed between the two members.

38. Apparatus of the class described comprising inner and outer cylindrical press members, one of which is eccentrically positioned with respect to the other, means for imparting an orbital travel to one of said members, said means being arranged to allow the eccentricity of the orbit of said member to vary, and means at the bottom of one member over which the other member has a sliding contact for confining material to be pressed between the two members.

39. Apparatus of the class described comprising inner and outer press members, the inner member being eccentrically positioned in the outer member, the inner of said members being arranged for motion in an orbit within the outer one, driving means for said inner member, and means at the bottom of one member over which the other member has a sliding contact for confining material to be pressed between the two members.

CLARENCE E. JENKINS.